(12) United States Patent
Carlton

(10) Patent No.: US 6,977,743 B2
(45) Date of Patent: Dec. 20, 2005

(54) DEVICE-INITIATED IMAGE PROCESSING TRANSACTION SYSTEM AND METHOD

(75) Inventor: Gary Carlton, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 933 days.

(21) Appl. No.: 09/840,957

(22) Filed: Apr. 24, 2001

(65) Prior Publication Data

US 2002/0154330 A1  Oct. 24, 2002

(51) Int. Cl.[7] .......................... G06F 15/00; H04N 1/46; H04N 5/232; H04N 9/04
(52) U.S. Cl. ................... 358/1.15; 501/505; 348/211.2; 348/211.3; 348/207.99
(58) Field of Search ............................... 358/1.15, 501, 358/505; 382/254; 348/207.99, 211.1, 211.2, 348/211.3, 262

(56) References Cited

U.S. PATENT DOCUMENTS 5,699,460 A * 12/1997 Kopet et al. ................ 382/307
6,003,065 A * 12/1999 Yan et al. .................... 709/201
6,324,545 B1 * 11/2001 Morag ......................... 707/202

* cited by examiner

Primary Examiner—Mark Wallerson
Assistant Examiner—Thomas J. Lett

(57) ABSTRACT

A device-initiated image processing transaction system and method for use in a network, for example, the Internet, operable to interconnect at least one imaging appliance and an image processing service provider. The imaging appliance, preferably provided to be IP-addressable, is operable to capture an image. Thereafter, a transaction session is initiated by the imaging appliance with the image processing service provider for effectuating appropriate image transformation. In one exemplary embodiment, the image is transmitted to the service provider for processing by a host processing engine co-located at the image processing service provider. In a second exemplary embodiment, the host processing engine and associated list of available transforms are downloaded for locally processing the image by the imaging appliance.

24 Claims, 6 Drawing Sheets

DEVICE-INITIATED IMAGE PROCESSING TRANSACTION SYSTEM AND METHOD

BACKGROUND OF THE INVENTION

1. Technical Field of the Invention

The present invention generally relates to intelligent imaging appliances. More particularly, and not by way of any limitation, the present invention is directed to a device-initiated image processing transaction system and method.

2. Description of Related Art

Modern imaging devices such as, e.g., digital cameras, optical scanners, et cetera, represent some of the more sophisticated equipment developed in recent years. Typically, these devices are provided with a built-in processor subsystem that accesses raw image data captured by an imaging mechanism for subsequent processing before storing the images in local memory. Further, the images may be exported in some instances to remote external devices such as computers which may be interconnected with the imaging devices in a suitable network configuration.

Because both storage and transmission capacities are finite, an important performance feature relating to the imaging devices is their ability to efficiently process the image data into appropriate file formats. This concern is especially significant where high-quality images are involved since they comprise huge amounts of digital information.

Some of the more advanced imaging devices are accordingly provided with copies of file format transforms and compression algorithms required for high-quality image processing. Although providing such file format transforms and compression algorithms is a significant improvement, there exist several shortcomings and deficiencies in this approach, however. First, it may be necessary to store numerous transforms and compression algorithms in order to be able to process the image data into various known formats. As more advanced formatting technologies are developed, it is thus necessary to update or replace the existing transforms. In addition, more importantly, the file format transforms and compression algorithms are typically built into the conventional imaging devices as fixed, static entities that are not readily amenable to replacement or updating. As a consequence, redesigning the image processing capabilities in the existing imaging devices is cumbersome and costly.

SUMMARY OF THE INVENTION

Accordingly, the present invention advantageously provides a device-initiated image processing transaction system and method whereby the image processing capabilities of imaging appliances can be easily updated or replaced as needed. The imaging appliance, preferably provided to be IP-addressable, is operable to capture an image. Thereafter, a transaction session is initiated by the imaging appliance with an image processing service provider for effectuating appropriate image transformation. In one exemplary embodiment, the image is transmitted to the service provider for processing by a host processing engine co-located at the image processing service provider. In a second exemplary embodiment, the host processing engine and associated list of available transforms are downloaded for locally processing the image by the imaging appliance.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
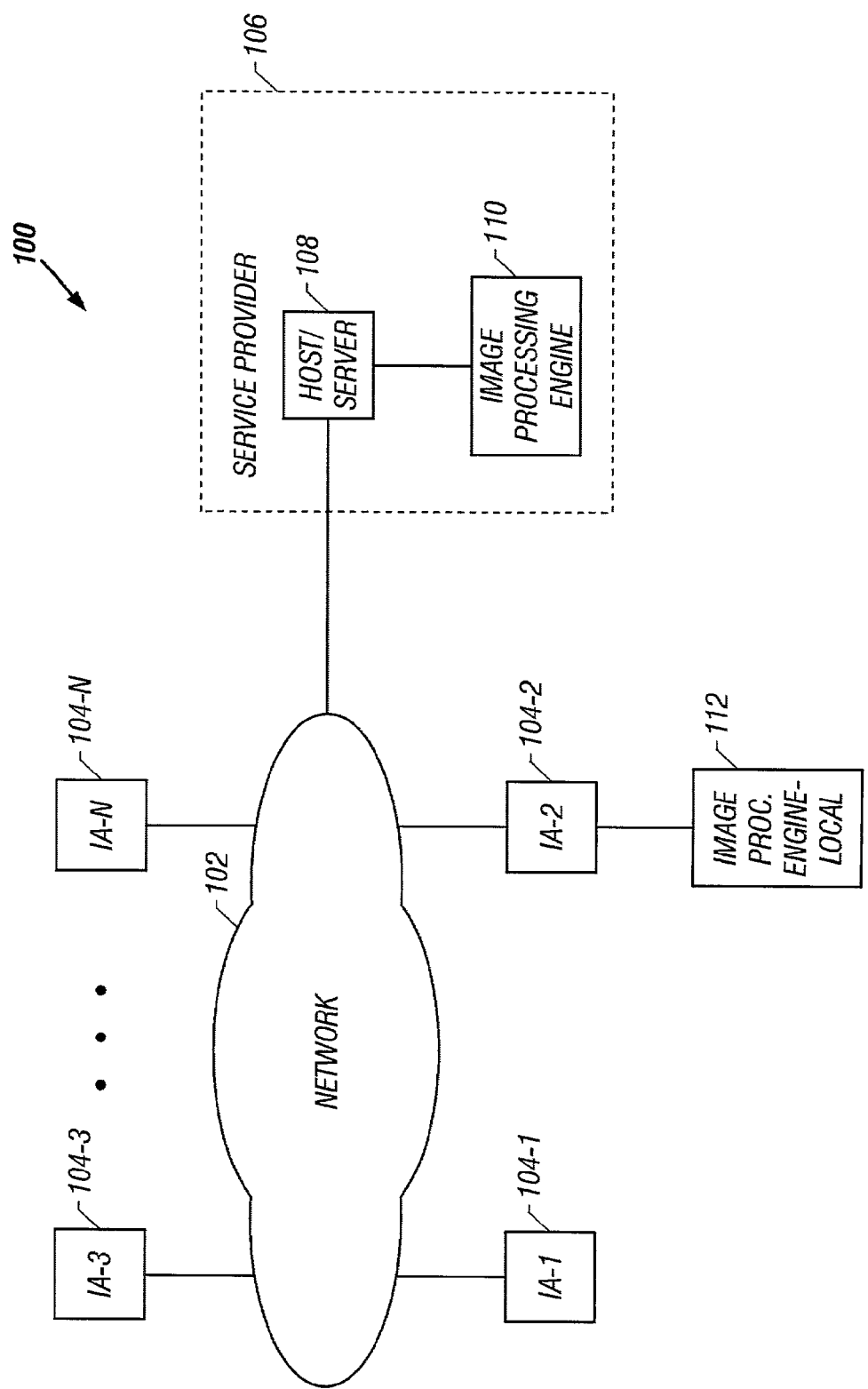
FIG. 1 is an exemplary network arrangement in accordance with an aspect of the present invention wherein a plurality of imaging appliances are operable to interact with an image processing service provider via a network.

In the drawings, like or similar elements are designated with identical reference numerals throughout the several views thereof, and the various elements depicted are not necessarily drawn to scale. Referring now to FIG. 1, depicted therein is an exemplary arrangement 100 wherein a plurality of intelligent imaging appliances (hereinafter referred to as "IA terminals") (reference numerals 104-1 through 104-N) are operable to interact with an image processing service provider 106 via a network 102 such as, e.g., the Internet, in accordance with the teachings of the present invention. Those skilled in the art should recognize upon reference hereto that at least a portion of the IA terminals may be commonly operated by a business enterprise and thus form a portion of the enterprise's corporate network such as, for instance, an intranet, a private local area network (LAN), wide area network (WAN), or metropolitan area network (MAN), and the like. On the other hand, IA terminals not part of any corporate network are maintained by individual operators.

Regardless of whether they are disposed in a private network or not, each IA terminal is preferably provided with an IP network interface such that it is operable as an "always on" network device capable of communicating with any network node having an IP address. The IP network connection may be a physical connection with a network interface card (NIC) utilizing an Ethernet protocol, or a wireless IR connection utilizing the IEEE 802.11 protocol. In the presently preferred exemplary embodiment of the present invention, the IA terminals are preferably comprised of imaging devices such as digital cameras, OCR readers, scanners, camcorders, devices using any portion of the electromagnetic spectrum for image capture, and so forth. Depending on device type, capability, and application, the IA terminals may or may not include a significant amount of image processing functionality. Where applicable, accordingly, an image processing engine may be included with an IA terminal for processing the images locally into such formats as JPEG, GIF, TIFF, MPEG, BMP, and the like. In FIG. 1, reference numeral 112 refers to an exemplary local image processing engine provided with IA terminal 104-2. It should be appreciated that although such local image processing can comprise image compression/decompression, transformation, translation, file formatting, et cetera, the overall processing functionality is of such a level that it may not be sufficient for facilitating optimized storage, broadband transmission, or for rendition in more advanced formats.

Continuing to refer to FIG. 1, in one exemplary embodiment, one or more service agreements such as, e.g., service level agreements, service subscription agreements, etc., may be provided between the operators of the IA terminals and the image processing service provider 106. Accordingly, in this embodiment, the IA terminals are allowed to initiate an online image processing transaction with the service provider's server node 108 for utilizing a host image processing engine 110 co-located thereat in accordance with a particular service agreement. The service agreements may include different service options, payment plans, rate schedules such as flat fee provisions (e.g., monthly, quarterly, or annual fees, or per corporate user) and per-use provisions wherein a predetermined amount is charged to the operator for each online image processing transaction, multiple levels of restrictions and authorizations, multi-tiered pricing schemes, volume or bulk transaction discounts, et cetera.

Figure 2:
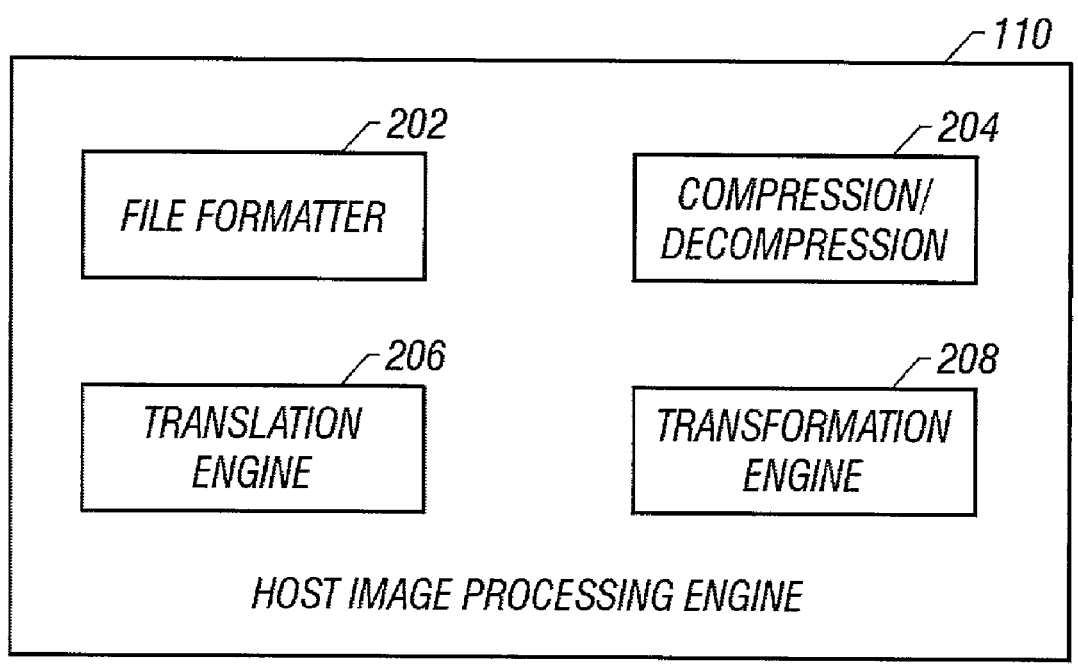
FIG. 2 depicts a high-level functional block diagram of an exemplary host image processing engine available at the image processing service provider for use in a device-initiated image processing transaction in accordance with the teachings of the present invention.

Preferably, the host processing engine 110 includes advanced file formats, transforms, and other related image processing algorithms for use by the subscribing operators. FIG. 2 depicts a high-level functional block diagram of an exemplary embodiment of the host image processing engine 110. A plurality of file formatter algorithms 202, suitable image compression and decompression algorithms 204, one or more translation engines or algorithms 206, and image transform engines or algorithms 208 are included in the exemplary host image processing engine 110. In an exemplary implementation, the various file formats, compression algorithms, translation engines and the transforms maintained by the image processing service provider 106 (shown in FIG. 1) may be proprietary. Preferably, the IA terminal of a service subscriber maintains a list of available transforms and is operable to initiate a transaction in order to effectuate the processing of a captured image in a select manner wherein a particular transform may be used.

Figure 3:
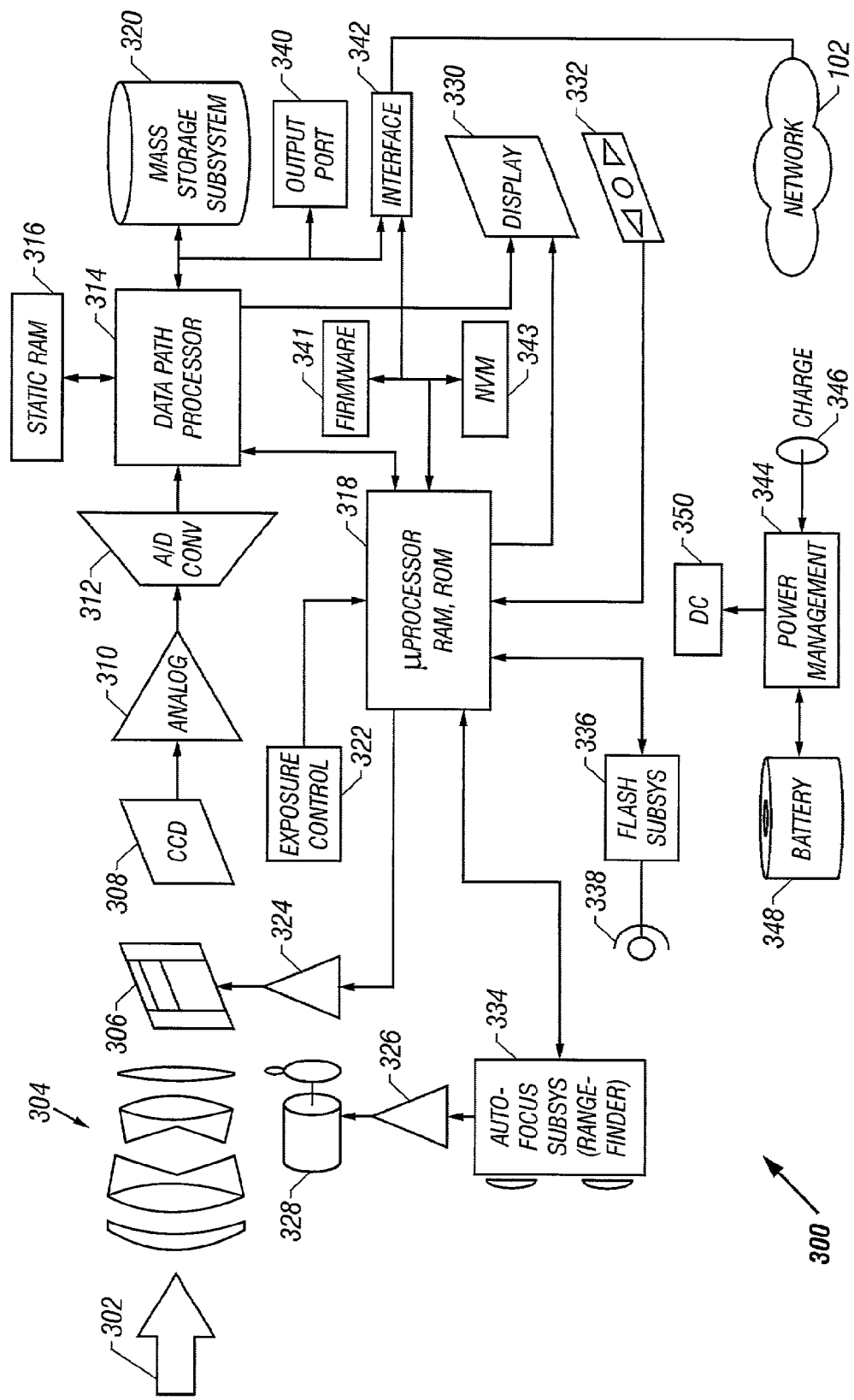
FIG. 3 depicts a block diagram of an exemplary digital camera appliance operable to interact with an image processing service provider.

Referring now to FIG. 3, depicted therein is a block diagram of an exemplary IP-addressable digital camera appliance 300 operable to interact with an image processing service provider (such as the service provider 106 described hereinabove) for effectuating a device-initiated image processing transaction in accordance with the teachings of the present invention. As in conventional appliances, reflected light 302 from an object to be imaged is captured through a suitable lens system 304. A shutter 306 is disposed for controlling the amount of captured light provided to a charge-coupled device (CCD) 308. Analog electrical signals generated by CCD 308 responsive to the incident light are amplified by an analog amplifier 310 and subsequently converted to digital form by means of an analog-to-digital (A/D) converter 312. A data path processor 314 in conjunction with volatile memory, e.g., static RAM 316, is operable to provide local image processing functionality such as frame buffering, compression, and the like, under the control of a microprocessor subsystem 318. Those skilled in the art should recognize that the microprocessor subsystem 318 may be based on a "cold-fired processor" wherein the act of capturing an image starts the processor operation. A local mass storage subsystem 320 is provided for storing captured images after suitable processing in a select manner.

An exposure control module 322 is operably coupled to the microprocessor subsystem 318. Responsive to the signals provided by the exposure control module 322, the microprocessor subsystem 318 is operable to provide shutter control signals for controlling the shutter 306 via a suitable gain stage 324. Further, a flash subsystem 336 in conjunction with a flash 338 is operably coupled to the microprocessor subsystem 318. An autofocus subsystem (e.g., a range finder) 334 is operable under the control of the microprocessor subsystem 318 to control a lens focusing mechanism 328 through a suitable gain stage 326.

A local display 330 also operable under the control of the microprocessor subsystem 318 is provided for previewing and/or reviewing images via the data path processor 314. An output port 340 (e.g., an infrared (IR) port) is included for providing image data to an external device (not shown) such as, e.g., a computer, a television set, and the like. A power management system 344 is operable to manage a battery system 348 and to provide DC power 350 for powering the various components of the digital camera 300. A charge subsystem 346 is preferably included to effectuate battery charging under the power management system 344.

A plurality of buttons 332 are provided for effectuating user control with respect to the microprocessor subsystem 318. Furthermore, in order to provide additional intelligence necessary to facilitate enhanced functionality, e.g., network interfacing, etc., the microprocessor subsystem 318 is coupled to an appropriate firmware subsystem 341, nonvolatile memory (NVM) 343, and other related modules so as to be capable of running a suitable embedded, realtime operating system (RTOS). In addition, a network interface connection subsystem 342 is operably coupled to the microprocessor subsystem 318 and the data path processor 314 for connecting to the packet-switched network 102. As alluded to hereinabove, connection to the network 102 by the network interface system 342 can be through an actual physical connection, or through a wireless connection. A physical connection device (i.e., a NIC) is adaptable to facilitate communications across the network depending on the particular networking scheme and protocol used by the network, such as Ethernet. A wireless connection may be effectuated by using a common wireless protocol such Bluetooth or the IEEE 802.11 protocol.

Figure 4:
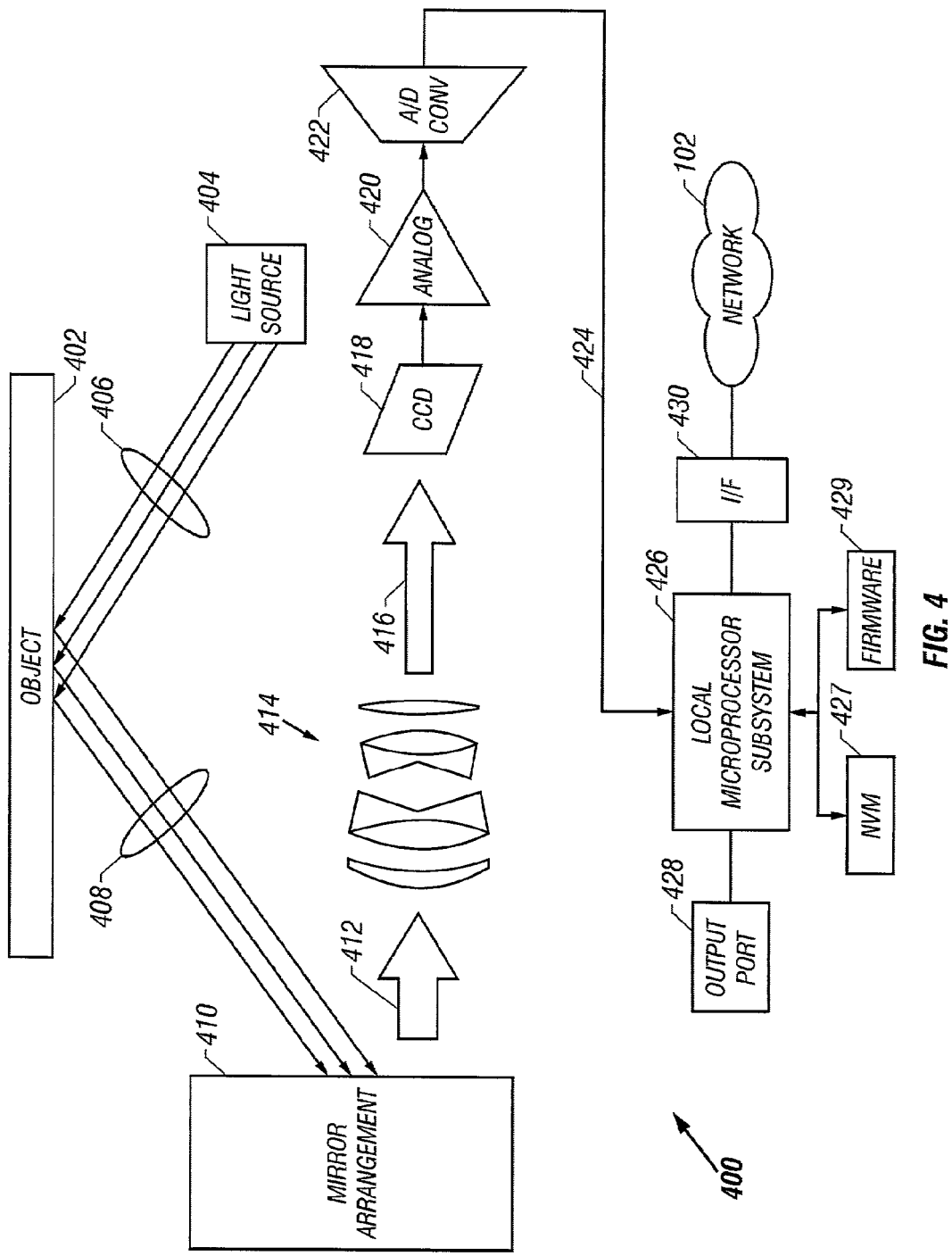
FIG. 4 depicts a block diagram of an exemplary scanner appliance operable to interact with an image processing service provider.

FIG. 4 depicts a block diagram of an exemplary scanner appliance 400 operable to interact with a service provider, such as the image processing service provider 106 disposed on the packet-switched network 102, for obtaining image processing services. A scanning light source 404 is operable to direct an incident light beam 406 on to a substantially flat object 402 (e.g., a document) to be scanned. A mirror arrangement 410 is disposed in an optical relationship with the object 402 so as to re-direct a reflected light beam 408 emanating from the surface of the object 402. The re-directed beam 412 is guided towards a lens arrangement 414 for appropriate focusing.

A charge-coupled device (CCD) 418 is disposed relative to the optical path 416 emanating from the lens arrangement 414 for generating analog electrical signals responsive to the received optical signals. An analog amplifier 420 is operable to amplify the electrical signals to appropriate levels before being converted to digital form by an A/D converter 422. The output from A/D converter 422 is provided via an interface 424 to a local microprocessor subsystem 426. An output port 428 is preferably included for effectuating a coupling relationship with an external device such as, e.g., a computer (not shown).

Similar to the digital camera 300 described in the foregoing with reference to FIG. 3, the local microprocessor subsystem 426 is operably coupled to NVM 427, firmware subsystem 429, and other related modules so as to be capable of executing an RTOS. Also, an appropriate network interface 430 is disposed for effectuating IP-connectivity with the network 102, which may be an actual physical connection, or a wireless connection.

Figure 5A:
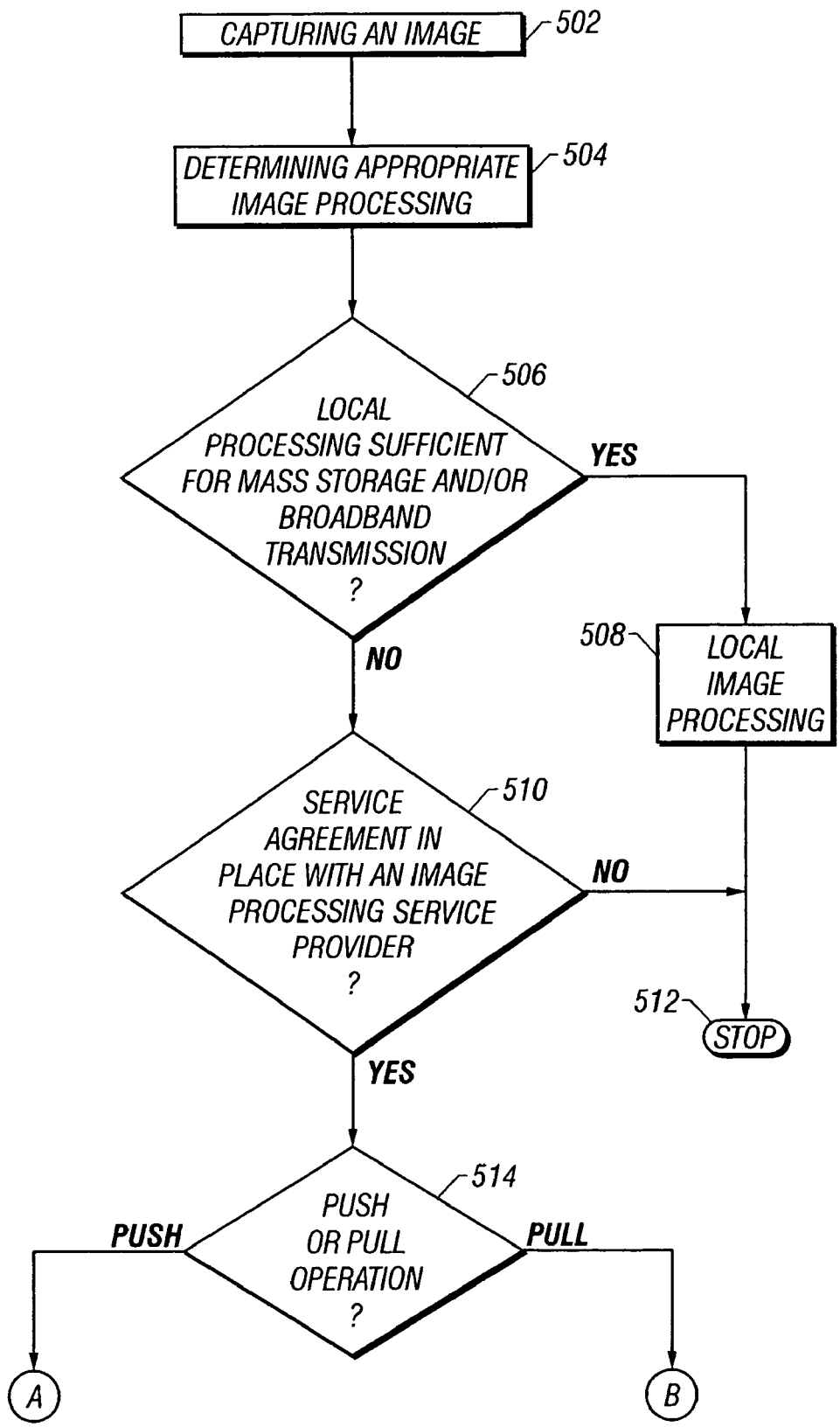
FIGS. 5A and 5B depict a flow chart of the various steps involved in an exemplary device-initiated image processing transaction methodology provided in accordance with the teachings of the present invention.
Figure 5B:
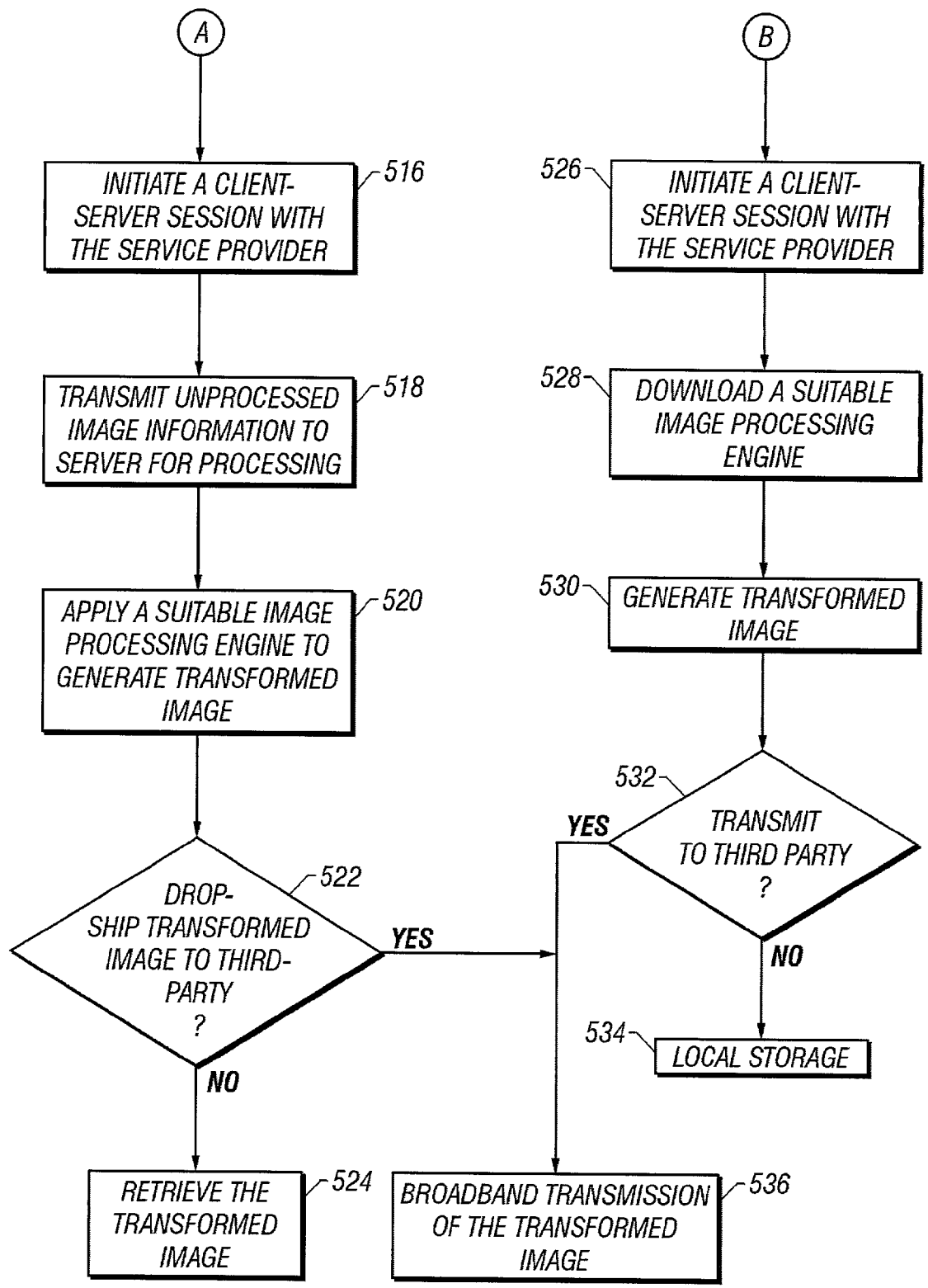

Referring now to FIGS. 5A and 5B, depicted therein is a flow chart of the various steps involved in an exemplary device-initiated image processing transaction methodology provided in accordance with the teachings of the present invention. Upon capturing an image by an IP-addressable intelligent IA terminal (step 502), a determination is made by the IA terminal's microprocessor subsystem in association with a suitable combination of logic structures (software, hardware, firmware, or any combination thereof) to ascertain the type or manner of image processing desired with respect to the captured image (step 504). Thereafter, another determination is made (decision block 506) as to whether the IA terminal includes sufficient image processing capability by way of appropriate file formatting algorithms, transforms, compression/decompression engines, etc. to process the image for local mass storage and/or for facilitating high speed transmission (i.e., broadband transmission) over the packet-switched network to a recipient. If the IA terminal's image processing engine is capable of accomplishing these objectives, the image is locally processed (step 508) and the transaction methodology subsequently stops (step 512).

If, on the other hand, the local image processing engine's capability is limited or does not include a particular transform required for the desired processing, another determination may be made (decision block 510) as to whether there is a valid service agreement between an image processing service provider and the IA terminal's operator. Such a service provider may be a seller of the IA terminals, offering the capability to update the IA terminals's functionality or to process the images captured by the IA terminals. In another exemplary embodiment, the service provider may be an independent entity with proprietary image processing technology that is available for use by subscribers.

In one exemplary embodiment, if there is no service agreement in place, the image processing transaction methodology is again terminated (step 512). A still further determination may be made (decision block 514) if there exists a valid service subscription, however, as to whether a push or pull operation is required. In a push operation, the image transmitted to the service provider's server site for processing the image in the desired manner by a host image processing engine. If a pull operation is required, an appropriate portion of the host image processing engine is downloaded to the IA terminal for processing the captured image locally. It should be recognized by those skilled in the art that in some implementations, a service agreement may itself specify which operational mode is required for a particular image processing transaction.

Regardless of whether a push or pull operation is indicated, the IA terminal initiates an online transaction session with the service provider's server site (i.e., a client-server transaction) (step 516 or step 526). As alluded to hereinabove, in the push operational mode, the unprocessed captured image is transmitted to the server (usually in narrowband) for processing (step 518). A suitable portion of the host image processing engine is applied to the transmitted image in order to generate a transformed image (step 520). If the transformed image is to be transmitted directly to a third-party recipient node on the network (i.e., drop-shipping) (decision block 522), the transformed image can be transmitted to such third-party node at high speed because of the transformation (step 536). On the other hand, the transformed image may simply be retrieved by the IA terminal for local mass storage or broadband re-transmission (step 524).

In the pull operational mode, a suitable portion of the host image processing engine (i.e., a particular transform, compression algorithm, or file formatter, etc.) is downloaded to the IA terminal (step 528). A transformed image is thereafter generated by applying the downloaded image processing portion to the captured image (step 530). If the transformed image is to be transmitted to a third-party recipient (decision block 532), the IA terminal engages in a broadband transmission session therewith for effectuating high speed transfer of the transformed image (step 536). Otherwise, the transformed image may be locally stored in an appropriate mass storage medium (step 534).

In a further aspect, the present invention is directed to a computer-readable medium operable with an imaging appliance connected to a public packet-switched network, e.g., the Internet. Preferably, the computer-readable medium carries a sequence of instructions which, when executed by a processing subsystem associated with the imaging appliance, causes the imaging appliance to perform the steps of the device-initiated image processing transaction method described in particular detail hereinabove.

Based upon the foregoing Detailed Description, it should be readily apparent that the present invention provides an efficient device-initiated image processing transaction scheme for use with intelligent IA terminals disposed in a network such as, e.g., a public packet-switched network. In one preferred exemplary implementation, the IA terminal simply maintains a list of available transforms and pulls appropriate translation engines from the service provider's web site as they are needed. The user could be charged a fee for the number of times a particular transform is used, or a large corporation could pay a fixed amount for unlimited use. Also, where service agreements are applicable, numerous other revenue models may be implemented. As new transforms are added to the service provider's web site, the IA terminal is operable to update its transform list. Thus, the terminal's memory can be optimized to store just the downloaded enine and the list of available transforms, as it does not need to include additional memory to store entire translation engines.

What is claimed is:

1. A device-initiated image processing transaction method, comprising:
   capturing an image by at least one imaging appliance;
   determining whether said at least one imaging appliance comprises image processing capability sufficient to process said image; and
   initiating by said at least one imaging appliance a transaction session with an image processing service provider coupled to said at least one imaging appliance via a network for effectuating one of an image push operation whereby said image is transmitted to said image processing service provider for processing in a select manner by a host processing engine co-located thereat and a pull operation whereby said host processing engine is downloaded for locally processing said image in said select manner.

2. The method as set forth in claim 1, wherein said at least one imaging appliance is selected from the group consisting of a digital camera, a scanner, a hand-held Optical Character Recognition (OCR) reader, a camcorder, and a device using a predetermined portion of the electro-magnetic spectrum for image capture.

3. The method as set forth in claim 1, wherein said host processing engine comprises an image compression algorithm.

4. The method as set forth in claim 1, wherein said host processing engine comprises an image decompression algorithm.

5. The method as set forth in claim 1, wherein said host processing engine comprises an image formatting algorithm.

6. The method as set forth in claim 1, wherein said host processing engine comprises an image translation algorithm.

7. The method as set forth in claim 1, wherein said host processing engine comprises an image transformation algorithm.

8. The method as set forth in claim 1, further comprising generating a transformed image by said image processing service provider after processing said image in said select manner.

9. The method as set forth in claim 8, further comprising transmitting said transformed image directly to a third-party node disposed on said network.

10. The method as set forth in claim 9, wherein said transmitting said transformed image is effectuated via broadband transmission.

11. The method as set forth in claim 8, further comprising retrieving said transformed image by said at least one imaging appliance.

12. The method as set forth in claim 1, further comprising generating a transformed image by said at least one imaging appliance after processing said image in said select manner by using said host processing engine downloaded from said image processing service provider.

13. The method as set forth in claim 12, further comprising transmitting said transformed image to a third-party node disposed on said network.

14. The method as set forth in claim 13, wherein said transmitting said transformed image is effectuated via broadband transmission.

15. A device-initiated image processing transaction system, comprising:
means for capturing an image by at least one imaging appliance;
means for determining whether said at least one imaging appliance comprises image processing capability sufficient to process said image;
means for initiating by said at least one imaging appliance a transaction session with an image processing service provider coupled to said at least one imaging appliance via a network; and
means for effectuating one of an image push operation whereby said image is transmitted to said image processing service provider for processing in a select manner by a host processing engine co-located thereat and a pull operation whereby said host processing engine is downloaded for locally processing said image in said select manner.

16. The system as set forth in claim 15, wherein said image processing capability of said at least one imaging appliance comprises a local processing engine capable of processing said image in said select manner.

17. The system as set forth in claim 15, wherein said at least one imaging appliance is selected from the group consisting of a digital camera, a scanner, a hand-held Optical Character Recognition (OCR) reader, a camcorder, and a device using a predetermined portion of the electro-magnetic spectrum for image capture.

18. The system as set forth in claim 15, wherein said host processing engine comprises at least one of an image compression algorithm, an image decompression algorithm, an image translation algorithm, an image transformation algorithm and an image formatting algorithm.

19. A computer-readable medium operable with an imaging appliance disposed in a network, said computer-readable medium carrying a sequence of instructions which, when executed by a processing subsystem associated with said imaging appliance, causes the following to be performed:
determining whether said at least one imaging appliance comprises image processing capability sufficient to process said image in a select manner;
initiating by said imaging appliance a transaction session with an image processing service provider coupled to said at least one imaging appliance via said network; and
effectuating one of an image push operation whereby said image is transmitted to said image processing service provider for processing in said select manner by a host processing engine co-located thereat and a pull operation whereby said host processing engine is downloaded for locally processing said image by said imaging appliance in said select manner.

20. The computer-readable medium as set forth in claim 19, wherein said at least one imaging appliance is selected from the group consisting of a digital camera, a scanner, a hand-held Optical Character Recognition (OCR) reader, a camcorder, and a device using a predetermined portion of the electro-magnetic spectrum for image capture.

21. The computer-readable medium as set forth in claim 19, wherein said host processing engine comprises at least one of an image compression algorithm, an image decompression algorithm, an image translation algorithm, an image transformation algorithm and an image formatting algorithm.

22. The computer-readable medium as set forth in claim 19, further comprising an additional sequence of instructions executable on said processing system for generating a transformed image by said at least one imaging appliance after processing said image in said select manner by using said host processing engine downloaded from said image processing service provider.

23. The computer-readable medium as set forth in claim 22, further comprising an additional sequence of instructions executable on said processing system for transmitting said transformed image to a third-party node disposed on said network.

24. The computer-readable medium as set forth in claim 23, wherein said transmitting said transformed image is effectuated via broadband transmission.

* * * * *